June 30, 1970  H. B. HARRIS  3,517,445

OPTO-MECHANICAL ALIGNMENT APPARATUS

Filed June 3, 1962  4 Sheets-Sheet 1

FIG.1.

INVENTOR.
HENRY B. HARRIS
BY
*S. C. Geeton*
ATTORNEY

INVENTOR.
HENRY B. HARRIS
BY
*S.C. Yeatns*
ATTORNEY

_United States Patent Office_ 3,517,445
Patented June 30, 1970

3,517,445
OPTO-MECHANICAL ALIGNMENT APPARATUS
Henry B. Harris, Scottsdale, Ariz., assignor to Sperry Rand Corporation, a corporation of Delaware
Filed June 3, 1968, Ser. No. 733,927
Int. Cl. G01c 15/00
U.S. Cl. 33—46                                    10 Claims

ABSTRACT OF THE DISCLOSURE

Apparatus for installing a flux valve in an aircraft including an invertible telescope assembly having first and second alignment tabs respectively fixedly oriented and rotatable in azimuth with respect to a sighting device, a telescope assembly support having a reference tab and adapted to be affixed to a level turntable, and a telescope assembly mount forming an integral part of a mount adaptor having an adaptor plate with an indexing surface corresponding to an alignment surface on the flux valve. To use the apparatus the telescope assembly is placed on the telescope assembly support affixed to the turntable positioned to the front or rear of the craft and the first alignment tab is held in contact with the reference tab while the turntable is rotated to sight the longitudinal axis of the craft thus orienting the reference tab with respect to the axis. Then the telescope assembly is inverted and the second alignment tab is placed in contact with the reference tab after which the sighting device is rotated in azimuth to sight the location of the flux valve mounting fixture thereby defining the angle between the longitudinal axis and the mounting fixture from the point of observation. Installation of the valve in the craft is completed by placing the telescope assembly in its inverted position on the mount adaptor with a reference tab thereon in contact with the second alignment tab and then the telescope assembly, mount adaptor and flux valve are rotated together to sight back on a center post of the telescope assembly support preparatory to securing the valve to its mounting fixture.

BACKGROUND OF THE INVENTION

The present invention relates to transit-type instruments and more specifically to modifications in such instruments enabling angles to be defined without the necessity for reading dials or scales. The invention is particularly useful for installing index flux valves in aircraft and therefore will be described with reference to such use but is not to be considered as restricted thereto.

A flux valve is an earth's magnetic field sensitive device comprising three coplanar, equiangularly spaced magnetometer-type coil elements mounted either pendulously or on a vertical gyro to sense the horizontal component of the earth's field to provide heading information for craft navigation. A valve having a mark on its case designating a magnetic axis, for example, the longitudinal axis of one of the coil elements arranged in a Y configuration, is referred to as preindexed. In aircraft applications the flux valve is usually mounted in a wing tip or some other location remote from the longitudinal axis of the craft to minimize the influence upon the valve of extraneous magnetic fields produced by structural elements of the craft and electronic and power generating equipment as well as bombs, missiles, or other armament in the case of military aircraft. For any application the orientation of the valve to the craft must be known and generally it is preferred that the magnetic axis be aligned parallel to the longitudinal axis of the craft. Heretofore, only non-indexed valves, that is, valves not having a magnetic axis marked thereon, having been available and the procedure for installing such valves in an aircraft with one of the coil elements aligned parallel to the craft's longitudinal axis has involved an elaborate sequence of operations including the following steps:

(a) Mounting the flux valve on a turntable apart from the aircraft in a region where the earth's field is stable and orienting the valve in a northerly direction, (b) Sighting a distant object through an azimuthally rotatable telescope affixed to the flux valve and locking the telescope in that position, (c) Towing the aircraft into position along a surveyed north line such that the flux valve mounting location in the aircraft is proximate the turntable, (d) Measuring the aircraft misalignment from the north line by means of plumb lines suspended from the fore and aft sections of the craft, (e) Rotating the telescope with respect to the flux valve along an azimuthal scale to compensate for the aircraft misalignment to north and locking the telescope at the compensated position, (f) Transferring the flux valve from the turntable to its location in the aircraft, (g) Rotating the valve and telescope together until the remote object is sighted through the telescope and, finally, (h) Securing the flux valve to the aircraft and removing the telescope.

This is a time consuming procedure requiring careful work on the part of skilled personnel since scales must be read to orient the valve and to compensate for the aircraft misalignment to north, the latter being determined either by trigonometric calculations or the use of nomographs based on the distance measurements between the plumb lines and the surveyed north line. In addition, the work must be performed in a magnetically stable area in which both a north line has been established and a distant object is available for sighting. Moreover, the considerable amount of operator activity involved increases the probability of the magnetic axis of the valve being misaligned from the longitudinal axis of the craft with resultant degradation in the accuracy of the heading information.

SUMMARY OF THE INVENTION

The present invention provides means for installing in an aircraft either an indexed flux valve or a flux valve indexing plate on the basis of simple geometrical principles thereby eliminating the necessity for the elaborate indexing, misalignment measurement and optical transfer procedure used in the prior art. A preferred embodiment of the invention comprises an invertible telescope assembly, a support therefor affixed to a turntable having leveling means and a mount adaptor for a flux valve or indexing plate. The telescope assembly includes a telescope rotatable in elevation about a horizontal axis passing through a vertical member connected to a single base plate at one end and a multiplate arrangement at the other end. The single plate is fixedly oriented in azimuth with respect to the sighting axis of the telescope and has a first alignment tab attached to it. The multiplate arrangement includes one plate which has a second alignment tab attached thereto and is rotatable in azimuth with respect to the sighting axis of the telescope. The telescope assembly support includes a center post for orienting the telescope assembly and a reference tab adapted to be placed in contact with the alignment tabs as will be described subsequently in connection with the procedure for installing a valve in a craft. The mount adaptor includes a telescope assembly mount having a center post and reference tab similar to those on the telescope assembly support, the mount being attached to one end of posts which connect at the other end to an adaptor plate having an indexing surface oriented in a prescribed relation with respect to the reference tab and a corresponding alignment surface on the flux valve or indexing plate.

To install a flux valve or indexing plate in an aircraft the mount adaptor is positioned in the craft with the indexing surface of the adaptor plate in contact with the alignment surface of the valve or indexing plate which is loosely connected to its mounting structure. The posts of the mount adaptor are made sufficiently long to assure that the telescope assembly mount protrudes above the aircraft structure so as to be visible from outside the craft. Then from a position approximately 100 ft. to the front or rear of the craft the longitudinal axis is sighted with the fixedly oriented tab in contact with the reference tab and the turntable is locked in azimuth. This orients the reference tab with respect to the longitudinal axis of the craft. Next, the telescope assembly is inverted to sight the center post on the mount adaptor with the azimuthally rotatable tab in contact with the reference tab and then the sighting device is locked in azimuth. This defines the angle between the longitudinal axis and the sight path to the flux valve. The procedure is completed by placing the telescope assembly in its inverted position on the mount adaptor with the reference tab thereon in contact with the azimuthally rotatable alignment tab and then the telescope assembly, mount adaptor and flux valve or indexing plate are rotated as a unit to sight back on the center post of the telescope assembly support affixed to the turntable preparatory to securing the valve or indexing plate to its mounting structure.

BRIEF DESCRIPTION OF THE DRAWINGS

FIG. 1 is a perspective view of a telescope assembly and telescope assembly support of the present invention depicted in relation to a turntable and tripod mechanism;

DESCRIPTION OF THE PREFERRED EMBODIMENTS

Figure 2:
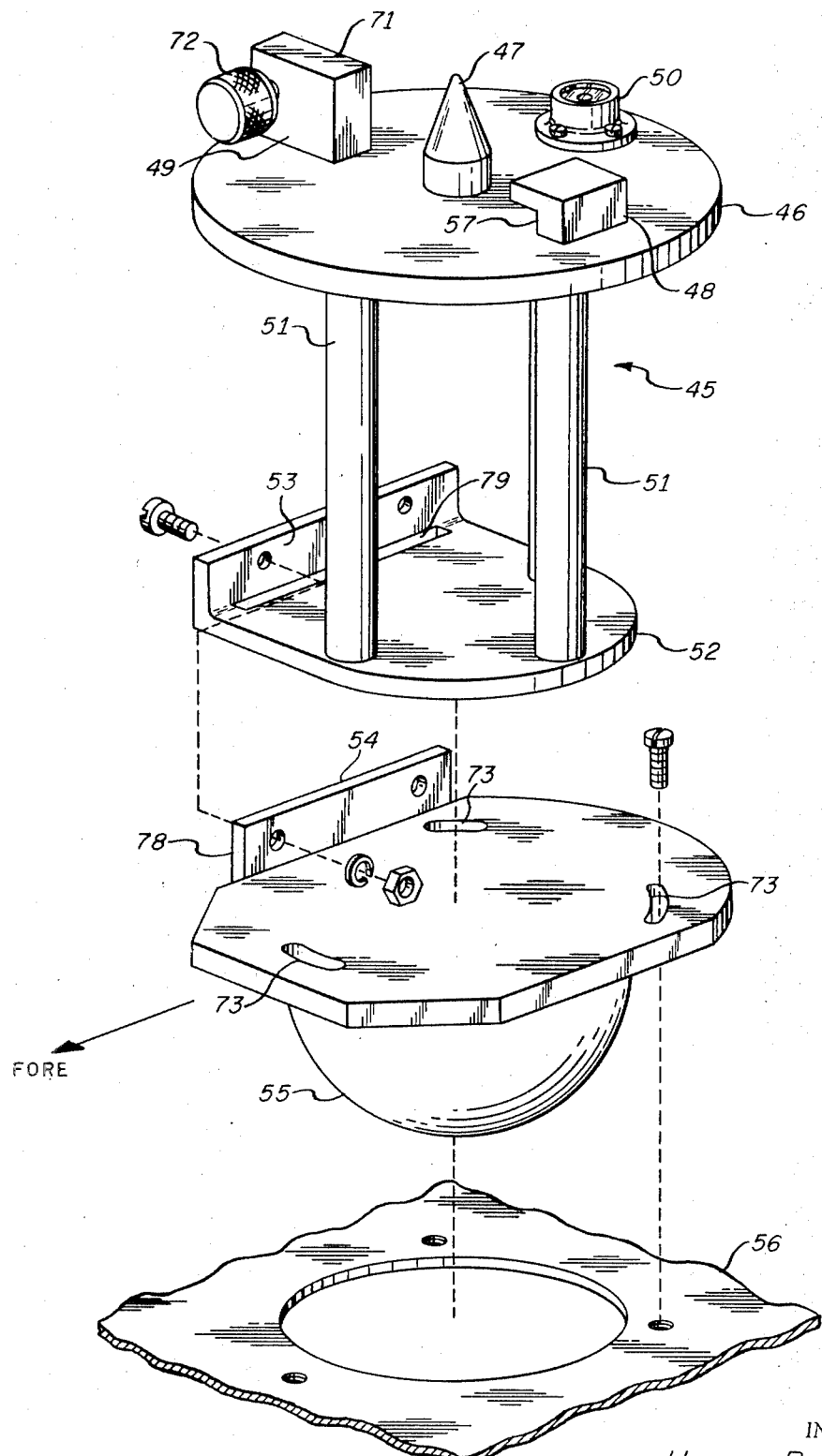
FIG. 2 is a perspective view of a mount adaptor of the present invention depicted in relation to a flux valve and flux valve mounting structure.

Referring to FIG. 1, turntable mechanism 10 is supported on bars 11 affixed to platform 12 which in turn is mounted on tripod 13. The turntable mechanism includes conventional leveling means 14 and azimuth adjustment means 15. Telescope assembly support 16 is connected by screws 17 to rotatable member 18 which is supported on stationary plate 19. To rotate the telescope assembly support freely about vertical axis 20 the azimuth locking screw 21 is turned out of contact with rotatable member 18. Fine azimuth adjustment is accomplished by turning the azimuth locking screw into contact with rotatable member 18 thereby locking the rotatable member and band 22 together and then turning fine azimuth screw 23 to rotate band 22 about the vertical axis.

Telescope assembly 24 comprises a telescope 25 rotatable in elevation about pins 26 connected to columns 27 which are attached at one end to base plate 28 and at the other end to inverted base mechanism 29. Base plate 28 includes an alignment tab 30, mounting guide tab 31 and concentric hole 32 to fit the telescope assembly over center post 33 on the telescope assembly support which further includes a reference tab 34, a mounting guide 35 and a level indicator 36. For ease of construction and use, alignment tab 30 is oriented with surface 37 perpendicular to the sighting axis of the telescope. It should be understood, however, that other orientations may be used as long as the tab is fixed in azimuth with respect to the telescope at a position compatible with other alignment surfaces which will be referred to subsequently.

Referring to FIG. 2, a mount adaptor 45 comprises a telescope assembly mount 46 having a center post 47, mounting guide 48, reference tab 49, and level indicator 50 similar to the corresponding parts on the telescope assembly support connected to the turntable. Telescope assembly mount 46 is attached to one end of posts 51 which are connected at the other end to adaptor plate 52. Indexing surface 53 on the adaptor plate is precisely aligned perpendicular to surface 71 of the reference tab 49 on the telescope assembly mount and alignment surface 54 on flux valve 55 is parallel to the magnetic axis of the valve.

The procedure for installing an indexed flux valve in an aircraft will now be described with reference to FIGS. 1 through 4. Initially flux valve 55 is loosely positioned in its mounting fixture 56 in the wing of the aircraft as shown in FIGS. 2 and 4. Then the mount adaptor is placed on top of the flux valve with indexing plate 78 fitted into slot 79 so that indexing surface 53 can be bolted into contact with alignment surface 54. The tripod assembly is positioned in front of the craft in line with its longitudinal axis and telescope assembly 24 is placed on support 16 with center post 33 extending through hole 32 in base plate 28 so that mounting guide tab 31 fits into the cut out portion 57 of mounting guide 35 and surface 37 of alignment tab 30 is held in contact with surface 58 of the reference tab by screw 59 inserted in hole 60. The leveling means 14 are then adjusted to level the turntable with the aid of level indicator 36 in preparation for sighting along the longitudinal axis as determined by structural components of the craft such as the leading edge of the tail assembly and a strut on the windshield. Slight misalignment from the longitudinal axis is compensated for by loosening screws 61 in platform 12 and rotating bars 11 thereabout to move the sighting axis of the telescope into alignment with the craft axis. Final sighting of the axis is accomplished by means of fine azimuth control 23. At this point surface 58 of reference tab 34 is perpendicular to the longitudinal axis of the craft. Next the telescope assembly is removed from support 16 and replaced thereon in the inverted position with center post 33 extending through hole 44 in rotatable plate 41 such that mounting guide tab 43 fits into the cutout region of mounting guide 35 and surface 62 on alignment tab 42 is held in contact with surface 58 on the reference tab by screw 59 inserted in hole 63. This can be accomplished simply by rotating the telescope assembly counterclockwise about the sighting axis directed toward the longitudinal axis of the craft. At this time surface 62 is also perpendicular to the longitudinal axis of the craft.

Figure 3:
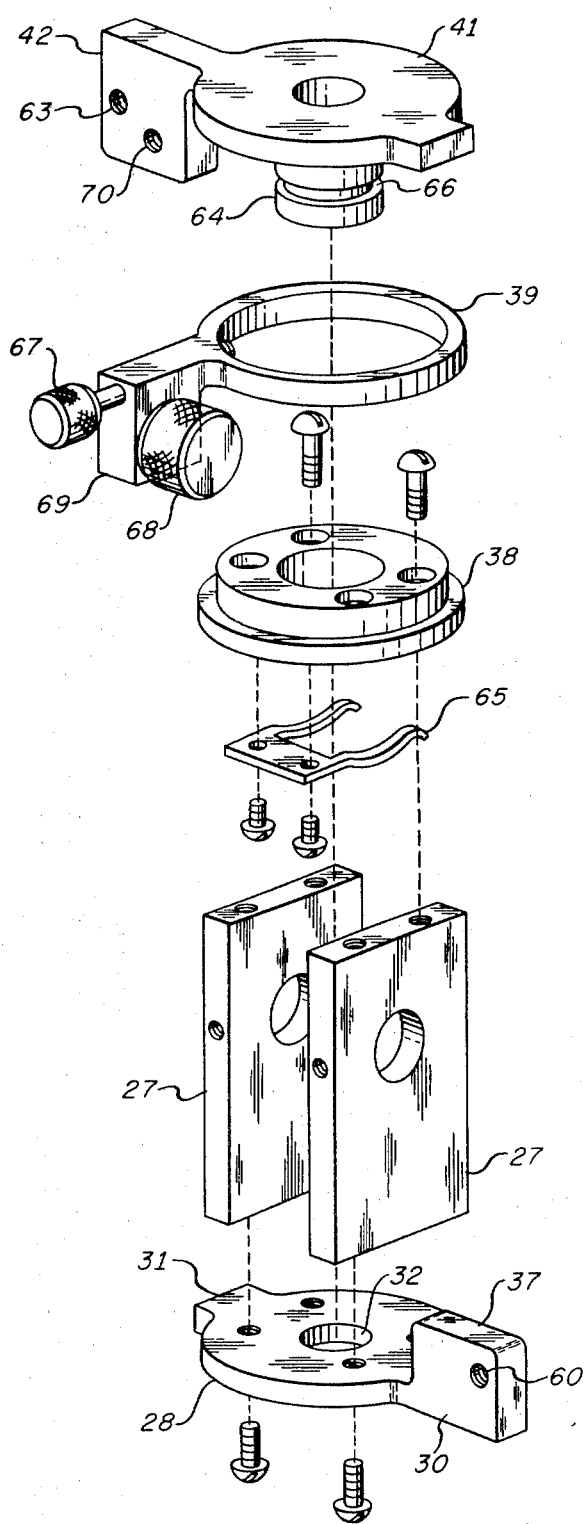
FIG. 3 is an exploded view of the multiplate arrangement containing the azimuthally rotatable alignment tab of the telescope assembly shown in FIG. 1.
Figure 4:
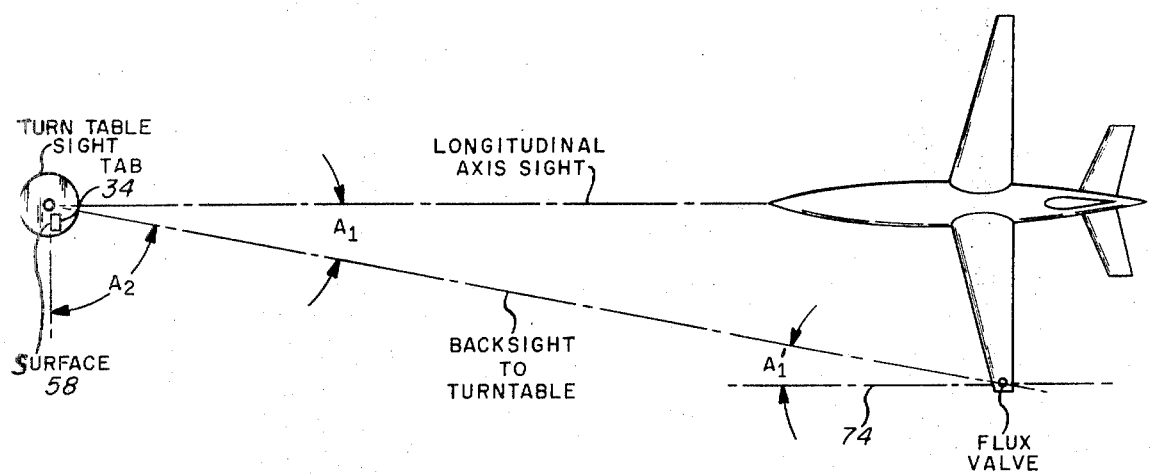
FIG. 4 is a diagram illustrating a method of using the apparatus shown in FIGS. 1 and 2 to install a flux valve in the wing of an aircraft.

As shown in FIG. 3, rotatable plate 41 is connected to a shaft 64 which extends through the center of band 39 and inverted base plate 38. A clip 65 attached to the inverted base plate passes through a groove 66 in shaft 64 to hold rotatable plate 41 in place over rotatable band 39. Screw 67 of the azimuth locking mechanism 40 is turned out of contact with inverted base plate 38 to enable band 39 to rotate with respect to the other parts of the telescope assembly so that it can be locked to rotatable plate 41 by means of screw 68 feeding through azimuth locking tab 69 into hole 70 in alignment tab 42. Then the sighting axis of the telescope is aimed at center post 47 on the mount adaptor installed in the wing of the craft by rotating the assembly supported on inverted base plate 38 with respect to band 39 and plate 41. When the center post is sighted screw 67 is turned into contact with inverted base plate 38 to lock the band and rotatable plate thereto. At this time the sighting axis of the telescope is at angles $A_1$ and $A_2$ respectively relative to the longitudinal axis of the craft and surface 58 of reference tab 34 as shown in FIG. 4.

The telescope assembly is now removed from support 16 and transferred to mount 46 on mount adaptor 45 such that surface 62 of alignment tab 42 is held in contact with surface 71 on reference tab 49 by screw 72 inserted in hole 63. Then the entire structure including the telescope assembly, mount adaptor and flux valve is rotated as guided by slots 73 in flux valve 55 until the telescope sights center post 33 on support 16 affixed to the turntable. When center post 33 is sighted angle $A_1'$ between the sight axis and line 74 is equal to angle $A_1$ and thus line 74 is parallel to the craft axis. Since reference tab surface 71 is perpendicular to both line 74 and alignment surface 53 the flux valve is thus aligned parallel to the craft axis.

Figure 5:
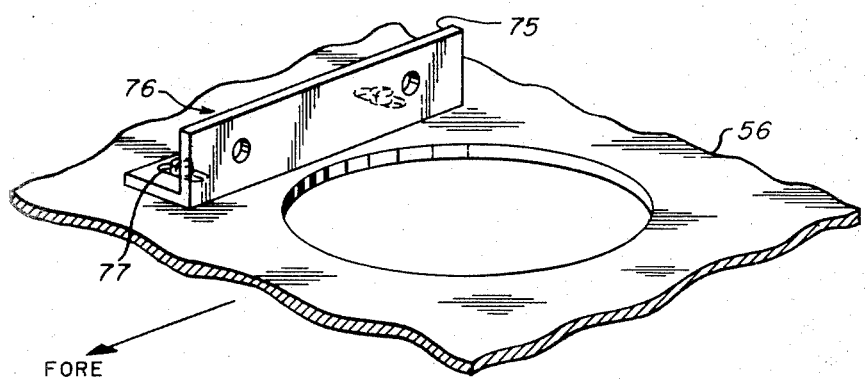
FIG. 5 is a perspective view of a flux valve indexing plate shown in relation to its mounting structure.

In addition to installing a flux valve directly into an aircraft the apparatus embodying the invention may also be used to install a flux valve indexing plate. In this case, referring to FIG. 5, surface 75 of indexing plate 76 is placed in contact with alignment surface 53 on the mount adaptor for rotation in slots 77 when backsighting on the turntable preparatory to securing the indexing plate to aircraft mounting fixture 56. Thereafter, a flux valve can be installed in the craft simply by bolting its alignment surface into contact with surface 75 on indexing plate 76.

It should be noted that in installing either a flux valve or an indexing plate if the mounting fixture in the craft is unlevel an alignment error will result proportional to the ratio of the horizontal and vertical distances between the mount adaptor and the turntable multiplied by the angular displacement from the horizontal plane. In typical installations, this alignment error will be on the order of 0.1 degree error per degree of unlevel. If a certain type aircraft is known to have a systematic unlevel in a given direction, the mount adaptor may be structurally designed to correct for the unlevel or alternatively may include leveling means such as those used on the turntable.

While the invention has been described in its preferred embodiments, it is to be understood that the words which have been used are words of description rather than limitation and that changes within the purview of the appended claims may be made without departing from the true scope and spirit of the invention in its broader aspects.

I claim:
1. Opto-mechanical apparatus for use with a level turntable, said apparatus comprising,
   a telescope assembly including a holder for a sighting device connecting therto,
   a telescope assembly support adapted to support said assembly and further adapted for mounting on said turntable,
   means on said support for locating said assembly thereon,
   a reference tab affixed to said support,
   a first alignment tab affixed to one end of said holder at a predetermined azimuthal orientation relative to said sighting device and adapted for being secured to said reference tab when said assembly is mounted with said one end thereof on said support for azimuthally orienting said reference tab with respect to a line of sight defined by said sighting device,
   a second alignment tab disposed at the end of said holder opposite from said one end in rotatably disengageable connection therewith and adapted for being secured to said reference tab when said assembly is mounted with said opposite end thereof on said support for azimuthally orienting said second alignment tab relative to said line of sight so that thereupon subsequent azimuthal rotation of said sighting device with said second alignment tab rotatably disconnected from said holder provides for said azimuthal rotation to be referenced to said line of sight, and
   an azimuthal locking mechanism cooperable with said holder and said second alignment tab for establishing said disengageable connection therebetween, said mechanism being normally operative for connecting said holder to said second alignment tab upon termination of said subsequent azimuthal rotation thereby to maintain a fixed angular rotation between said second alignment tab and said sighting device.

2. The apparatus of claim 1 wherein said holder includes a plate at said one end and a multiplate arrangement at said opposite end, said first alignment tab being affixed to said plate and said second alignment tab being affixed to one plate of said multiplate arrangement.

3. The apparatus of claim 2 wherein the multiplate arrangement includes said one plate, an additional plate and a band therebetween, said additional plate being fixedly secured to said holder; and said azimuthal locking mechanism includes first securing means for rotatably securing said one plate to said band and second securing means for rotatably securing said band to said additional plate.

4. The apparatus of claim 1 wherein said first and second alignment tabs and said reference tab each have a surface matching one another and further including first holding means for holding the matching surfaces of said reference tab and said first alignment tab in contact with one another when said assembly is mounted with said one end thereof on said support, and second holding means for holding the matching surfaces of said reference tab and said second alignment tab in contact with one another when said assembly is mounted with said opposite end thereof on said support.

5. The apparatus of claim 4 wherein said support includes a mounting guide having a cutout, and said assembly includes a first mounting guide tab adapted for insertion in said cutout and operable in conjunction with said first holding means for mounting said assembly with said one end thereof on said support and a second mounting guide tab adapted for insertion in said cutout and operable in conjunction with said second holding means for mounting said assembly with said opposite end thereof on said support.

6. The apparatus of claim 5 wherein said locating means is a post concentric with the axis of rotation of said turntable and tapered at the end distal said support.

7. The apparatus of claim 6 wherein said first alignment tab is an integral part of a plate at said one end of said holder and said second alignment tab is an integral part of a multiplate arrangement at said opposite end of said holder, said multiplate arrangement comprising first and second plates and a band immediate the plates, said first plate being fixedly secured to said holder and, said second alignment tab being disengageably affixed to said second plate.

8. The apparatus of claim 7 further including level indicating means positioned on said support, means for rotating said sighting device in a vertically oriented plane, and means for adjusting the azimuthal position of said turntable and locking said turntable at a desired azimuthal orientation.

9. The apparatus of claim 1 in combination with a mount adaptor comprising,
   an adaptor plate connected to said mount adaptor,
   a telescope assembly mount supported on said adaptor plate and adapted to support said assembly,
   a reference surface on said mount adaptor adapted to be secured in contact with said matching surfaces of said first and second alignment tabs accordingly as said one end and said opposite end of said holder are positioned on said mount adaptor,
   means for positioning said assembly on said mount adaptor, and
   an indexing surface on said adaptor plate having a prescribed orientation relative to said reference surface.

10. Apparatus for aligning a mount for a directional reference device as a point in a vehicle laterally displaced from the longitudinal axis of said vehicle such that the directional axis of said reference device is precisely parallel to said longitudinal axis of said vehicle, said apparatus comprising,
  a telescope assembly including a holder having a sighting device connected thereto,
  a telescope assembly support adapted to support said assembly and further adapted for mounting on said turntable,
  means on said support for locating said assembly thereon,
  a reference tab affixed to said support,
  a first alignment tab affixed to one end of said holder at a predetermined azimuthal orientation relative to said sighting device and adapted for being secured to said reference tab when said assembly is mounted with said one end thereof on said support for azimuthally orienting said reference tab with respect to said longitudinal axis,
  a second alignment tab disposed at the end of said holder opposite from said one end in rotatably disengageable connection therewith and adapted for being secured to said reference tab when said assembly is mounted with said opposite end thereof on said support for azimuthally orienting said second alignment tab relative to said longitudinal axis so that thereupon with said second alignment tab rotatably disconnected from said holder azimuthal rotation of said sighting device for the purpose of aligning the sighting axis thereof with said device mounting point provides an angular relationship between said alignment tab and the sighting axis of said sighting device corresponding to the angle between said longitudinal axis extension and the sighting axis direction to said device mounting point as measured from said sighting point,
  an azimuthal locking mechanism cooperable with said holder and said second alignment tab for establishing said disengageable connection therebetween, said mechanism being normally operative for connecting said holder to said second alignment tab upon termination of said subsequent azimuthal rotation thereby to maintain a fixed angular orientation between said second alignment tab and said sighting device,
  a mount for said directional device mounted on said vehicle and angularly adjustable about said device mounting point and including a reference element adapted to be held in contact with said second alignment tab,
  means for detachably mounting said assembly to said mount with said second alignment tab secured to said reference element,
  means for angularly adjusting said telescope assembly and said mount in unison so as to sight back on the rotational axis of said turntable, and
  means for rigidly securing said mount to said vehicle.

References Cited

UNITED STATES PATENTS

| | | | |
|---|---|---|---|
| 2,596,468 | 5/1952 | Callahan | 33—72 |
| 2,782,512 | 2/1957 | Viale | 33—72 |
| 2,818,652 | 1/1958 | Baker | 33—72 |
| 3,071,959 | 1/1963 | Depp | 33—224 X |

WILLIAM D. MARTIN, JR., Primary Examiner

U.S. Cl. X.R.

33—69